(12) United States Patent
Kitagawa

(10) Patent No.: US 10,940,869 B2
(45) Date of Patent: Mar. 9, 2021

(54) DRIVING ASSISTANCE APPARATUS

(71) Applicant: DENSO CORPORATION, Kariya (JP)

(72) Inventor: Nozomi Kitagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 341 days.

(21) Appl. No.: 15/775,576

(22) PCT Filed: Sep. 13, 2016

(86) PCT No.: PCT/JP2016/076882
§ 371 (c)(1),
(2) Date: May 11, 2018

(87) PCT Pub. No.: WO2017/086000
PCT Pub. Date: May 26, 2017

(65) Prior Publication Data
US 2018/0370544 A1 Dec. 27, 2018

(30) Foreign Application Priority Data
Nov. 17, 2015 (JP) .............................. JP2015-225003

(51) Int. Cl.
*B60W 50/14* (2020.01)
*B60W 30/16* (2020.01)
(Continued)

(52) U.S. Cl.
CPC ............ *B60W 50/14* (2013.01); *B60W 30/09* (2013.01); *B60W 30/16* (2013.01); *B60W 30/18163* (2013.01); *B62D 15/025* (2013.01); *B62D 15/029* (2013.01); *G08G 1/167* (2013.01); *B60W 2540/215* (2020.02); *B60W 2554/80* (2020.02)

(58) Field of Classification Search
USPC ............................................ 701/24
See application file for complete search history.

(56) References Cited

U.S. PATENT DOCUMENTS

2005/0155808 A1 6/2005 Braeuchel et al.
2008/0065293 A1* 3/2008 Placke ............... B60K 31/0008
701/41

(Continued)

FOREIGN PATENT DOCUMENTS

JP H08-002356 A 1/1996
JP H09-091596 A 4/1997

(Continued)

*Primary Examiner* — Tyler D Paige
(74) *Attorney, Agent, or Firm* — Maschoff Brennan

(57) ABSTRACT

A driving assistance apparatus includes a driving assister section, a scene determiner section, and an assignment determiner section. The driving assister section provides a driving assistance to a driver in a vehicle using a sensing result by a sensor device monitoring a periphery of the vehicle. The scene determiner section determines whether a driving scene requiring the driver to confirm safety takes place. The assignment determiner section determines an assignment of an implementation work that is to be implemented by the driver according to the driving scene when the scene determiner section determines that the driving scene requiring the driver to work takes place; the practice work precludes an exemption work from which the driving assister section exempts the driver.

16 Claims, 12 Drawing Sheets

(51) Int. Cl.
  *B62D 15/02*   (2006.01)
  *G08G 1/16*    (2006.01)
  *B60W 30/18*   (2012.01)
  *B60W 30/09*   (2012.01)

(56) References Cited

U.S. PATENT DOCUMENTS

| | | |
|---|---|---|
| 2008/0185207 A1 | 8/2008 | Kondoh |
| 2012/0216208 A1 | 8/2012 | Takemura et al. |
| 2015/0194055 A1* | 7/2015 | Maass ............... G08G 1/096716 340/905 |
| 2016/0091896 A1* | 3/2016 | Maruyama ............ B60W 50/10 701/23 |
| 2016/0311323 A1* | 10/2016 | Lee ......................... B60K 35/00 |
| 2017/0267241 A1* | 9/2017 | Matsunaga ...... B60W 30/18009 |
| 2017/0364070 A1* | 12/2017 | Oba ..................... G05D 1/0061 |
| 2019/0126927 A1* | 5/2019 | Uejima ........... B60W 30/18163 |

FOREIGN PATENT DOCUMENTS

| | | |
|---|---|---|
| JP | 2005-519807 A | 7/2005 |
| JP | 2008-213823 A | 9/2008 |
| JP | 2010-097270 A | 4/2010 |
| JP | 2011-100338 A | 5/2011 |
| JP | 2011-134103 A | 7/2011 |
| JP | 2013-149105 A | 8/2013 |
| JP | 2014-181020 A | 9/2014 |
| JP | 2015-66963 A | 4/2015 |

\* cited by examiner

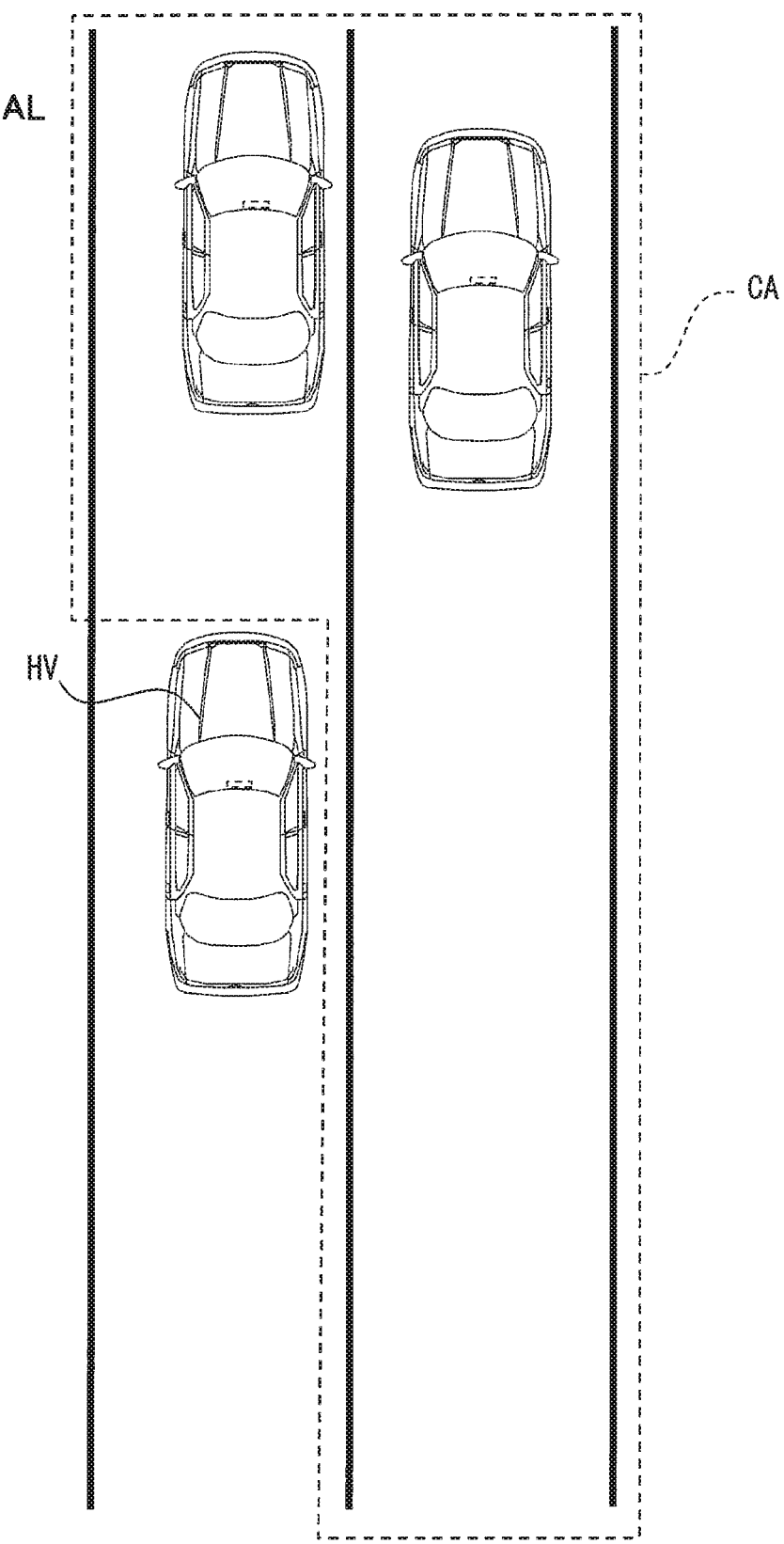
FIG. 4
CONVENTIONAL

<BEFORE CHANGING ASSIGNMENT>

<AFTER CHANGING ASSIGNMENT>

DRIVING ASSISTANCE APPARATUS

CROSS REFERENCE TO RELATED APPLICATION

The present application is based on Japanese Patent Application No. 2015-225003 filed on Nov. 17, 2015, the disclosure of which is incorporated herein by reference.

TECHNICAL FIELD

The present disclosure relates to a driving assistance apparatus which assists driving of a driver.

BACKGROUND ART

There is conventionally known a technology which assists driving of a driver. For instance, Patent literature 1 discloses a technology that performs an automated lane change of a vehicle to an adjacent lane based on a manipulation to a blinker lever by a driver.

PRIOR ART LITERATURES

Patent Literature

Patent literature 1: JP 2005-519807 A (US 2005/155808 A1)

SUMMARY OF INVENTION

Note that the technology disclosed in Patent literature 1 performs an automated lane change of the vehicle to an adjacent lane based on the driver's manipulation to a blinker lever; thus, the driver needs to determine the point of time at which the lane change is enabled. To perform a lane change, the driver needs not only confirming safety in an area in an adjacent lane, which the vehicle is going to move to enter, diagonally behind the vehicle, but also confirming safety whether the vehicle approaches too close to a preceding vehicle ahead of the vehicle while determining the point of time at which the lane change is possible.

Driving manipulation at lane changes usually provides a driver with more load than confirming safety at lane changes; thus, the technology disclosed in Patent literature 1 still provides a driver with a load although assisting the driving.

It is an object of the present disclosure to provide a driving assistance apparatus that can relieve a driver from a load in a driving scene needing a work by the driver.

To achieve the object, according to an aspect of the present disclosure, a driving assistance apparatus is provided to include a driving assister section that provides a driving assistance to a driver in a vehicle using a sensing result by a sensor device monitoring a periphery of the vehicle. The driving assistance apparatus further includes a scene determiner section and an assignment determiner section. The scene determiner section determines whether a driving scene requiring the driver to work takes place. The assignment determiner section determines an assignment of an implementation work that is to be implemented by the driver according to the driving scene when the scene determiner section determines that the driving scene requiring the driver to work takes place, the implementation work precluding an exemption work, wherein the driving assister section exempts the driver from executing the exemption work.

Under such a configuration, the assignment determiner section determines an assignment of an implementation work that is to be implemented by the driver according to the driving scene requiring the driver to work. The implementation work precludes an exemption work from which the driving assister section exempts the driver. The implementation work precludes the exemption work from which the driver is exempted by the driving assistance. This decreases the work the driver is required to conduct. As a result, the work load by the driver can be reduced in the driving scene requiring the driver to work.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram illustrating an example of an area where the driver needs to confirm safety in lane change in a conventional art;

EMBODIMENTS FOR CARRYING OUT INVENTION

A plurality of embodiments and modification examples for disclosure are explained with reference to the drawings. To simplify the explanation, among the embodiments and modification examples, a second component having the same function as that of a first component illustrated in a drawing in the foregoing explanation is assigned with the same reference sign of the first component and may be omitted from the following explanation. The second component assigned with the same reference sign may refer to the explanation in foregoing embodiments and/or modification examples.

First Embodiment

<Schematic Configuration of Driving Assistance System 1>

Figure 1:
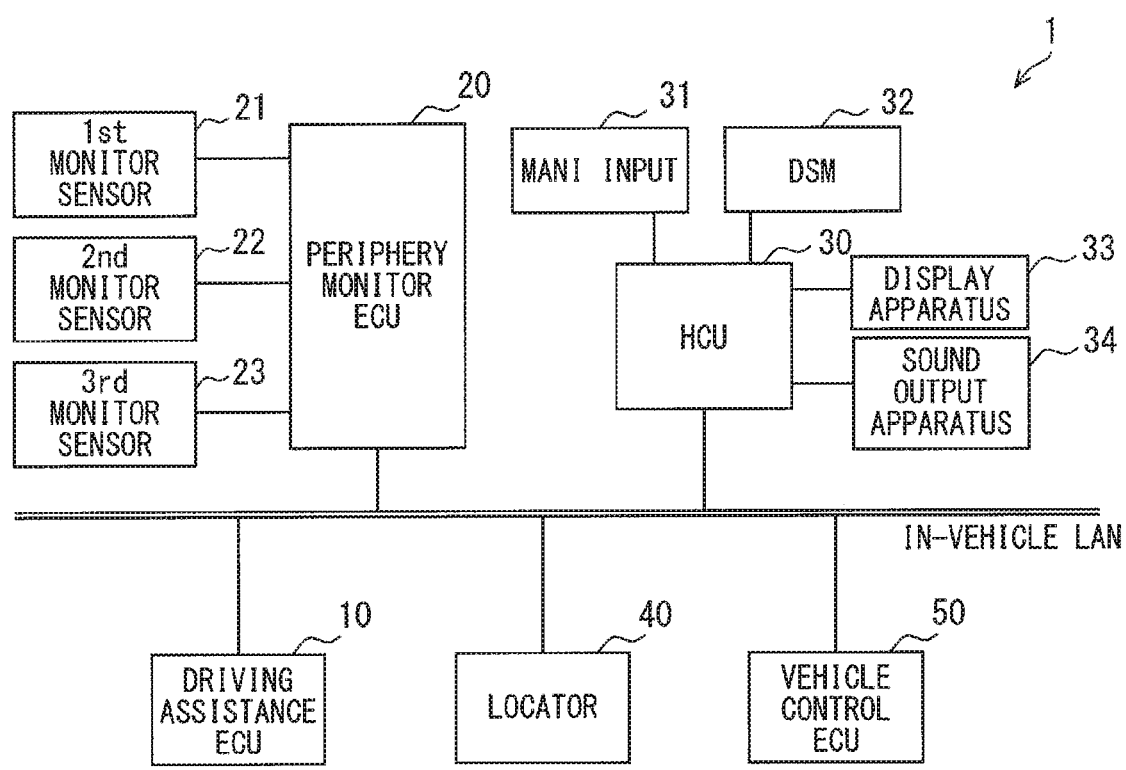
FIG. 1 is a diagram illustrating an example of a schematic configuration of a driving assistance system.

The following explains a first embodiment of the present disclosure with reference to the drawings. FIG. 1 illustrates a driving assistance system 1 mounted in a vehicle. The driving assistance system 1 includes a driving assistance ECU 10, a periphery monitoring ECU 20, a first monitoring sensor 21, a second monitoring sensor 22, a third monitoring sensor 23, an HCU (Human machine interface Control Unit) 30, a manipulation input unit 31, a DSM (Driver Status Monitor) 32, a display apparatus 33, a sound output apparatus 34, a locator 40, and a vehicle control ECU 50. The driving assistance ECU 10, the periphery monitoring ECU 20, the HCU 30, the locator 40, and the vehicle control ECU 50 are connected to each other via an in-vehicle LAN, for instance. Hereinafter, the vehicle mounted with the driving assistance system 1 is referred to as a host vehicle HV.

The first monitoring sensor 21, the second monitoring sensor 22, and the third monitoring sensor 23 each are a monitoring sensor that monitors a periphery of the host vehicle HV. The first monitoring sensor 21, the second monitoring sensor 22, and the third monitoring sensor 23 are used to detect a movable object such as a pedestrian or a vehicle, or a static object such as an installation object, a traffic sign, or a compartment line. The first monitoring sensor 21, the second monitoring sensor 22, and the third monitoring sensor 23 each are equivalent to a sensor. Further, a sensor device may be referred to as including the first monitoring sensor 21, the second monitoring sensor 22, and the third monitoring sensor 23.

The first monitoring sensor 21, the second monitoring sensor 22, and the third monitoring sensor 23 each include a camera, a sonar, a milliwave radar, or a laser radar, for instance.

Figure 2:
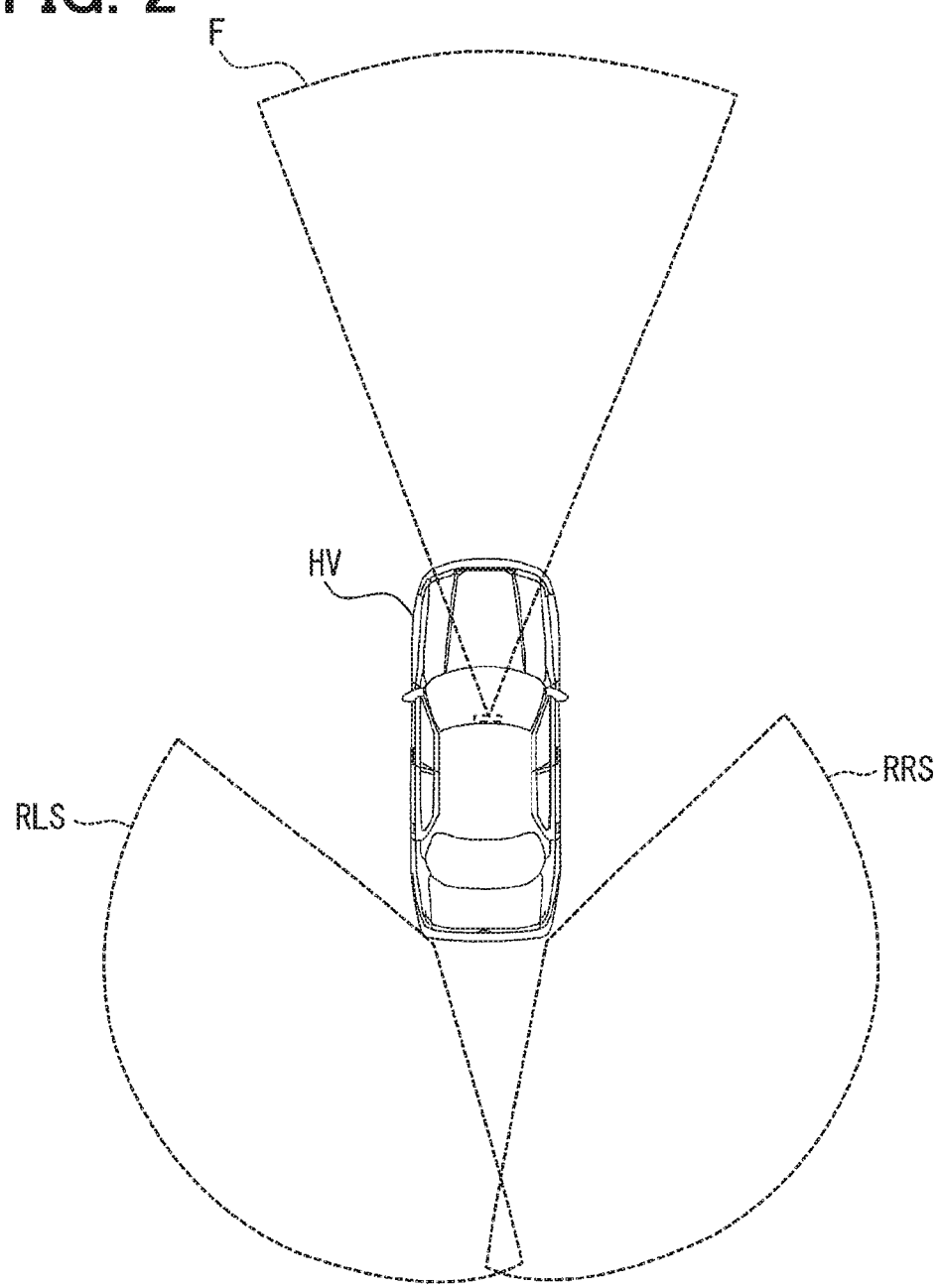
FIG. 2 is a diagram illustrating examples of sensing ranges of a first monitoring sensor, a second monitoring sensor, and a third monitoring sensor.

The first monitoring sensor 21 is a camera which is installed, for instance, at a rearview mirror in a room center in the vehicle compartment of the host vehicle HV to capture an image of a predetermined range in front of the host vehicle HV (refer to "F" in FIG. 2). As an example, the first monitoring sensor 21 captures an image of a range of about 80 meters from the host vehicle HV with a horizontal viewing angle of about 45 degrees. The following refers such a predetermined range in front of the host vehicle HV as a front range F. The first monitoring sensor 21 captures images successively and outputs the data of the captured images successively to the periphery monitoring ECU 20.

The second monitoring sensor 22, which is installed at a right-hand position of a rear of the host vehicle HV, scans a predetermined range (refer to "RRS" of FIG. 2) in a rear and right area relative to the host vehicle HV while sending out submillimeter waves of 24 GHz band via a transmission antenna. The second monitoring sensor 22 receives the submillimeter waves reflected by an object which is present in the predetermined range in the rear and right area relative to the host vehicle HV via a reception antenna. As an example, the second monitoring sensor 22 scans a range of about 40 meters from the host vehicle HV with a horizontal scanning angle of about 120 degrees. The following refers such a predetermined range in a rear and right area relative to the host vehicle HV as a rear and right range RRS. The second monitoring sensor 22 outputs a scanning result based on the received signal to the periphery monitoring ECU 20 successively.

The third monitoring sensor 23, which is installed at a left-hand position of a rear of the host vehicle HV, scans a predetermined range (refer to "RLS" of FIG. 2) in a rear and left area relative to the host vehicle HV while sending out submillimeter waves of 24 GHz band via a transmission antenna. The third monitoring sensor 23 receives the submillimeter waves reflected by an object which is present in the predetermined range in the rear and left area relative to the host vehicle HV via a reception antenna. As an example, the third monitoring sensor 23 scans a range of about 40 meters from the host vehicle HV with a horizontal scanning angle of about 120 degrees. The following refers such a predetermined range in a rear and left area relative to the host vehicle HV as a rear and left range RLS. The third monitoring sensor 23 outputs a scanning result based on the received signal to the periphery monitoring ECU 20 successively.

The data of the captured image by the first monitoring sensor 21, the scanning results by the second monitoring sensor 22 and the third monitoring sensor 23 based on the received signals each are equivalent to a sensing result. In addition, the range whose image is captured by the first monitoring sensor 21, and the range scanned by the second monitoring sensor 22 or the third monitoring sensor 23 each are equivalent to a sensing range.

The periphery monitoring ECU 20, which includes a CPU, a volatile memory, a nonvolatile memory, an I/O, and a bus that connects the foregoing, implements various processes by executing control programs stored in the nonvolatile memory. All or part of the functions implemented by the periphery monitoring ECU 20 may be configured as hardware components such as one or more ICs.

The periphery monitoring ECU 20 acquires the information from the first monitoring sensor 21 and detects data with respect to an object present in the front range F based on the acquired information; the detected data include a distance from the host vehicle HV, a relative position with the host vehicle HV, and a relative speed with the host vehicle HV. For instance, a known image recognition process such as a template matching may be used to detect a pedestrian or a vehicle such as an automobile, a bicycle, and a motorcycle, as a detection target. When using a camera as a monitoring sensor, an image recognition process may be performed by cutting out a captured image, which is narrower than an image capturing range (i.e., a sensing range). Hereinafter, the range used for the image recognition process is referred to as a detection target range. The first embodiment explains an example of a detection target as a preceding vehicle ahead of the host vehicle HV. Note that "information," which may be used not only as an uncountable noun but also a countable noun, is equivalent to an informational item. One information is equivalent to one informational item; a plurality of informations are equivalent to a plurality of informational items.

In addition, when a single-lens camera is used, a relative position of an object with the host vehicle HV and a distance between an object and the host vehicle HV may be determined from an installed position and a direction of an optical axis of the camera relative to the host vehicle HV, and a position of the object in the captured image. When a stereo camera is used, a distance between the host vehicle HV and an object may be determined based on a parallax amount of a pair of cameras. Furthermore, a relative speed of the object with the host vehicle HV may be determined from a change rate of the distance between the host vehicle HV and the object.

The periphery monitoring ECU 20 acquires the information from the second monitoring sensor 22 and detects data with respect to an object present in the rear and right range RRS based on the acquired information; the detected data include a distance from the host vehicle HV, a relative direction with the host vehicle HV, and a relative speed with the host vehicle HV. The periphery monitoring ECU 20 detects an object based on the reception intensity of the reflected waves which are produced by the object reflecting the submillimeter waves set out from the second monitoring sensor 22. In addition, the periphery monitoring ECU 20 detects the direction of the object with the host vehicle HV from the direction from which the submillimeter waves that produce the reflection waves are sent out. Furthermore, the periphery monitoring ECU 20 detects the distance between the host vehicle HV and the object, from a period of time from when transmitting the submillimeter waves to when receiving the reflected waves. In addition, the periphery monitoring ECU 20 detects the relative speed of the object with the host vehicle HV based on the Doppler shift between the reflected waves and the submillimeter waves sent out. Further, the relative speed of the object with the host vehicle HV may be detected from the time-based change rate of the distance between the host vehicle HV and the object.

Further, similar to the case of using the information of the second monitoring sensor 22, the periphery monitoring ECU 20 acquires the information from the third monitoring sensor 23 and detects data with respect to an object present in the rear and left range RLS based on the acquired information; the detected data include a distance from the host vehicle HV, a relative direction with the host vehicle HV, and a relative speed with the host vehicle HV. The periphery monitoring ECU 20 then outputs the detection results (hereinafter, monitoring information) to the in-vehicle LAN.

The manipulation input unit 31 includes switches that the driver of the host vehicle HV manipulates. For example, the manipulation input unit 31 includes a steering switch provided in a spoke part of the steering wheel of the host vehicle HV. The steering switch is used to perform the various setups including the setup in which the driver sets up the necessity or not of the activation of a driving assistance application to be mentioned later. In addition, the manipulation input unit 31 includes a blinker lever provided in a steering column. The blinker lever outputs a blinker signal at the time of turning to the right or left to the HCU 30 depending on manipulation to the blinker lever.

The DSM 32 includes (i) a near-infrared light source and a near-infrared camera, and (ii) a control unit that controls the foregoing. The DSM 32 is arranged, for instance, at an upper surface of the instrument panel while having the posture which turns the near-infrared camera towards the driver seat of the host vehicle HV. The DSM 32 captures an image of the face of the driver who is irradiated with the near-infrared light from the near-infrared light source, by using the near-infrared camera. The captured image by the near-infrared camera is subjected to an image analysis by a control unit. The control unit extracts the direction of the driver's face and the sight line direction of both eyes, for instance, from the captured image. The DSM 32 outputs the extraction result to the HCU 30.

The display apparatus 33 includes a combination meter, a CID (Center Information Display), or an HUD (Head-Up Display). The combination meter is arranged in front of the driver seat. The CID is arranged above the center cluster in the vehicle compartment. The combination meter displays the various images for the information notice on a display screen of a liquid crystal display based on the image data obtained from the HCU 30.

The HUD projects the light of the pictures based on the picture data obtained from the HCU 30 onto a projection region defined in the windshield. The windshield reflects the light of the pictures towards the vehicle compartment so as to be viewed by the driver who is seated in the driver seat. The driver is able to see the virtual image of the pictures projected by the HUD to be superimposed on an external scenery ahead of the host vehicle HV.

The sound output apparatus 34 includes an audio speaker. The audio speaker is arranged in a lining of a door of the host vehicle HV. The audio speaker can perform the information notice to an occupant by sound that is reproduced.

The HCU 30, which includes a CPU, a volatile memory, a nonvolatile memory, an I/O, and a bus that connects the foregoing, implements various processes by executing control programs stored in the nonvolatile memory. All or part of the functions implemented by the HCU 30 may be configured as hardware components such as one or more ICs.

The HCU 30 controls the display apparatus 33 and the sound output apparatus 34. In addition, the HCU 30 implements the process based on the variety of information inputted from the manipulation input unit 31 or the DSM (Driver Status Monitor) 32. For instance, when the HCU 30 determines that the direction of the face and/or sight line direction of the driver obtained from the DSM 32 does not face the front, the driver may be determined as failing to look at the road.

The locator 40 includes a GNSS (Global Navigation Satellite System) receiver, an inertia sensor such as a gyro sensor, and a memory storing map data. The GNSS receiver receives the positioning signal from a plurality of artificial satellites. The locator 40 measures a position of the host vehicle HV by combining positioning signals received by the GNSS receiver and measurement results of the inertial sensor. The locator 40 reads the map data corresponding to an area ahead of the host vehicle HV from the memory, and extracts the road information such as an intersection position. The locator 40 then outputs the position information on the host vehicle HV and the road information ahead of the host vehicle HV to the in-vehicle LAN. The locator 40 may be a car navigation apparatus or an ADAS (Advanced Driver Assistance Systems) locator, for example.

The vehicle control ECU 50 is an electronic control unit which performs acceleration and deceleration control and/or steering control of the host vehicle HV. The vehicle control ECU 50 includes a steering ECU which performs steering control, a power unit control ECU which performs acceleration and deceleration control, and a brake ECU. The vehicle control ECU 50 acquires detection signals from a sensor mounted in the host vehicle HV, such as an accelerator position sensor, a brake stepping-on force sensor, a steering angle sensor, or a speed sensor, and outputs a control signal to a travel control device such as an electronically controlled throttle, a brake actuator, and an EPS (Electric Power Steering) motor. In addition, the vehicle control ECU 50 can output the detection signals from the above respective sensors to the in-vehicle LAN.

The driving assistance ECU 10 may also be referred to as a driving assistance apparatus. For instance, in the present embodiment, the driving assistance ECU 10 includes a CPU, a volatile memory, a nonvolatile memory, an I/O, and a bus that connects the foregoing, implements various processes by executing control programs stored in the nonvolatile memory. All or part of the functions implemented by the driving assistance ECU 10 may be configured as hardware components such as one or more ICs.

The driving assistance ECU 10 controls the vehicle control ECU 50, thereby implementing a plurality of driving assistance applications which perform assistance or vicarious implementation of driving manipulation by the drive. In addition, the driving assistance ECU 10 performs assignment (hereinafter, task share) of a task that the driver implements and a task that the driving assistance application implements, in driving behavior requiring the driver to confirm safety. Such confirming safety is equivalent to a work.

<Schematic Configuration of Driving Assistance ECU 10>

Figure 3:
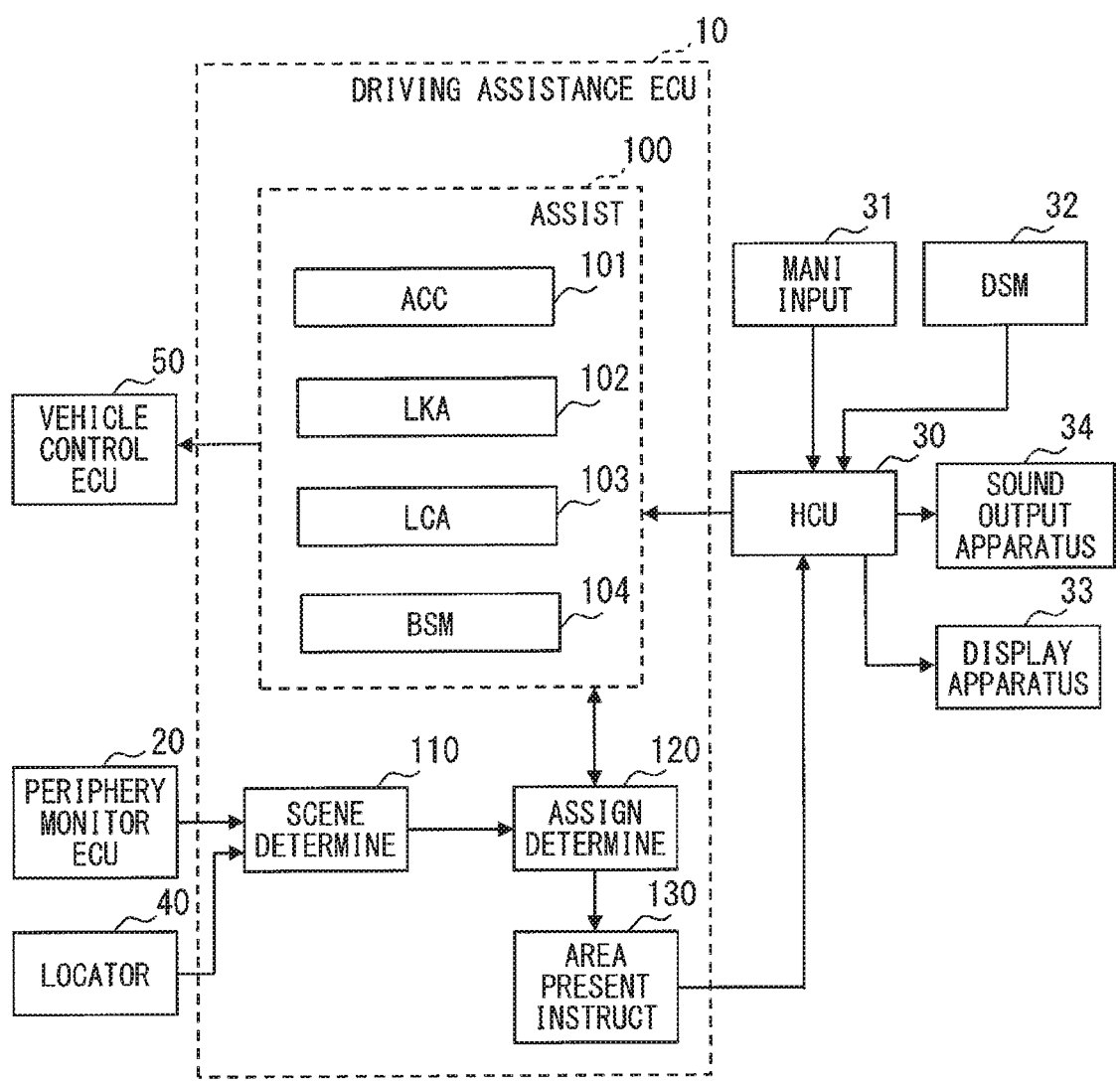
FIG. 3 is a diagram illustrating an example of a schematic configuration of a driving assistance ECU.

The following explains a schematic configuration of the driving assistance ECU 10 using FIG. 3. The driving assistance ECU 10 includes, as in FIG. 3, an assister section 100, a scene determiner section 110, an assignment determiner section 120, and an area presentation instructor section 130 (also referred to as an assister 100, a scene determiner 110, an assignment determiner 120, and an area presentation instructor 130).

The assister section 100, which may be also referred to as a driving assister section or a driving assister 100, performs the processes relating to the driving assistance. The assister section 100 implements the control program stored in the nonvolatile memory of the driving assistance ECU 10, thereby configuring functional blocks of an ACC (Adaptive Cruise Control) function section 101, an LKA (Lane Keeping Assist) function section 102, an LCA (Lane Change Assist) function section 103, and a BSM (Blind Spot Monitor) function section 104. Such functional blocks implement the driving assistance applications mentioned above.

The ACC function section 101 causes the vehicle control ECU 50 to adjust the driving force and the braking force based on the monitoring information of a preceding vehicle ahead of the host vehicle HV by the first monitoring sensor 21, thereby achieving the function of ACC that controls the travel speed of the host vehicle HV. The monitoring information of a preceding vehicle is acquired from the periphery monitoring ECU 20. When any preceding vehicle is not detected, the ACC function section 101 makes the host vehicle HV travel with a constant speed of a target travel speed set by the driver via the manipulation input unit 31. In contrast, when a preceding vehicle is detected, the ACC function section 101 sets the speed of the preceding vehicle as a target travel speed while setting a target inter-vehicle distance up to the preceding vehicle according to the target travel speed. The ACC function section 101 causes the host vehicle HV to perform a tracking travel to follow the preceding vehicle while controlling the acceleration and deceleration to match with the target inter-vehicle distance. The speed of the preceding vehicle may be obtained from (i) the relative speed of the preceding vehicle with the host vehicle HV detected by the periphery monitoring ECU 20, and (ii) the vehicle speed of the host vehicle HV obtained from the signal of the speed sensor of the host vehicle HV.

The LKA function section 102 causes the vehicle control ECU 50 to adjust the steering force, thereby achieving the function of LKA which controls the rudder angle of the steering wheel of the host vehicle HV. The LKA function section 102 allows the generation of the steering force to the direction so as to prevent an approach to the travel compartment line, thereby maintaining the host vehicle HV within the current lane the host vehicle HV is currently running. Hereinafter, a within-lane driving assistance is defined as a driving assistance which achieves an automated driving within a current lane the host vehicle HV is currently running by both the the function of ACC and the function of LKA cooperating with each other.

The LCA function section 103 achieves the function of LCA which moves the host vehicle HV to an adjacent lane from the current lane the host vehicle HV is currently running. When a lane change is enabled, the LCA function section 103 causes the vehicle control ECU 50 to move the host vehicle HV to an adjacent lane by generating the steering force to the direction so as to allow the host vehicle HV to move to the adjacent lane.

The BSM function section 104 achieves the function of BSM which reports the presence of a different vehicle etc., in a rear and left area or a rear and right area relative to the host vehicle HV based on the monitoring information by the second monitoring sensor 22 and the third monitoring sensor 23 from the periphery monitoring ECU 20. The BSM function section 104 notifies the driver of the presence of such a different vehicle in a rear and left area or a rear and right area relative to the host vehicle HV using the HCU 30.

The scene determiner section 110 determines whether a driving scene that requires the driver to confirm safety takes place based on the travel state of the host vehicle HV and/or the situation of the periphery of the host vehicle HV. The first embodiment explains an example of a driving scene requiring the driver to confirm safety as "lane change condition being satisfied."

For example, the scene determiner section 110 determines whether a lane change condition is satisfied based on (i) the position of the host vehicle HV and the position of an intersection which are obtained from the locator 40, and (ii) the inter-vehicle distance between the host vehicle HV and the preceding vehicle which is obtained from the periphery monitoring ECU 20. As a specific example, a lane change condition may be determined to be satisfied when (I) the host vehicle HV is separated from an intersection a predetermined distance or greater and, simultaneously, (ii) the inter-vehicle distance between the host vehicle HV and the preceding vehicle is equal to or less than a predetermined value.

The above predetermined distance may be set as needed to be at least equal to or greater than a distance prohibiting a lane change before an intersection. In contrast, the above predetermined value may be set as needed to be a target inter-vehicle distance under the preceding vehicle running with a speed significantly lower than a regulation limiting speed. Further, the predetermined value may be changed as needed according to a regulation limiting speed contained in the map data acquired from the locator, or a fixed constant value regardless of the regulation limiting speed.

In addition, another configuration may be allowed. That is, the scene determiner section 110 may determine that a lane change condition is satisfied when (i) the host vehicle HV is separate from an intersection a predetermined distance or greater, and, simultaneously, (ii) a blinker signal from the blinker lever is obtained via the HCU 30. In this case, it may be determined also from the blinker signal whether the host vehicle HV intends to change the current lane to the right lane or to the left lane. Suppose that whether a lane change condition is satisfied is determined without using any blinker signal. For instance, which lane the host vehicle HV is currently running may be determined based on the position of the host vehicle HV and the road information which are obtained from the locator 40, and the lane information included in the monitoring information obtained from the periphery monitoring ECU 20; thereby, which side of the left side or the right side the host vehicle HV needs to perform a lane change to move to may be estimated.

Furthermore, suppose a case that the driving assistance ECU 10 can obtain the information on a scheduled route that the host vehicle HV is scheduled to travel, such as a recommended route during route guidance by a car navigation apparatus or a scheduled route due to an automated driving. In such a case, the scene determiner section 110 may determine whether a lane change condition is satisfied by using the scheduled route. For instance, the scene determiner section 110 may determine the lane change condition being satisfied when the scheduled route indicates that the host vehicle HV needs a right/left turn at an intersection in the heading direction and a lane change is necessary for the right/left turn.

The assignment determiner section 120 determines an assignment of a confirmation area that is an area whose safety is to be confirmed by the driver according to the driving scene when the scene determiner section 110 determines that the driving scene requiring the driver to confirm safety takes place, the confirmation area precluding an exemption area, wherein the assister section 100 exempts the driver from confirming safety of the exemption area. As a specific example, the nonvolatile memory of the driving assistance ECU 10 may store a correspondence relation between (i) the driving assistance applications being implemented and (ii) the confirmation areas to be associated with the driving scenes. This correspondence relation may be referred to by the assignment determiner section 120 so as to determine the confirmation area corresponding to the driving scene and the driving assistance application being implemented.

Note that the safety confirmation exempted in the exemption area is equivalent to an exemption work; the safety confirmation performed on the confirmation area is equivalent to an implementation work.

At a lane change to an adjacent lane the host vehicle HV intends to move to enter, the driver primarily performs a safety confirmation of a front area relative to the host vehicle HV and a safety confirmation of a rear and lateral area relative to the host vehicle HV in the adjacent lane. In contrast, in a configuration of the first embodiment, suppose a case that a driving scene is "lane change condition being satisfied". In this case, in the front range F, an approach to an obstacle is enabled to be avoided by the ACC function section 101 functioning to automatically control the host vehicle HV; thus, the front area relative to the host vehicle HV is determined as an exemption area. In contrast, the rear and lateral area relative to the host vehicle HV in the adjacent lane for lane change is determined as a confirmation area by the assignment determiner section 120. This confirmation area precludes the front area relative to the host vehicle HV defined as an exemption area.

Note that in the rear and right range RRS and the rear and left range RLS, an approach to an obstacle can be avoided by the BSM function section 104 functioning to report the presence of a different vehicle etc.; however, the rear and lateral area relative to the host vehicle HV is not defined as an exemption area. This is because the second monitoring sensor 22 and the third monitoring sensor 23 each have a comparatively short maximum detection distance; thus, it is difficult to detect a vehicle approaching from a distant position with a high speed, the vehicle possibly interfering with the lane change. In a desirable task share, the driver is assigned with a task that is more appropriately performed by the driver than the driving assistance application; the driving assistance application is assigned with a task that is enabled to be completed by the driving assistance application.

Figure 5:
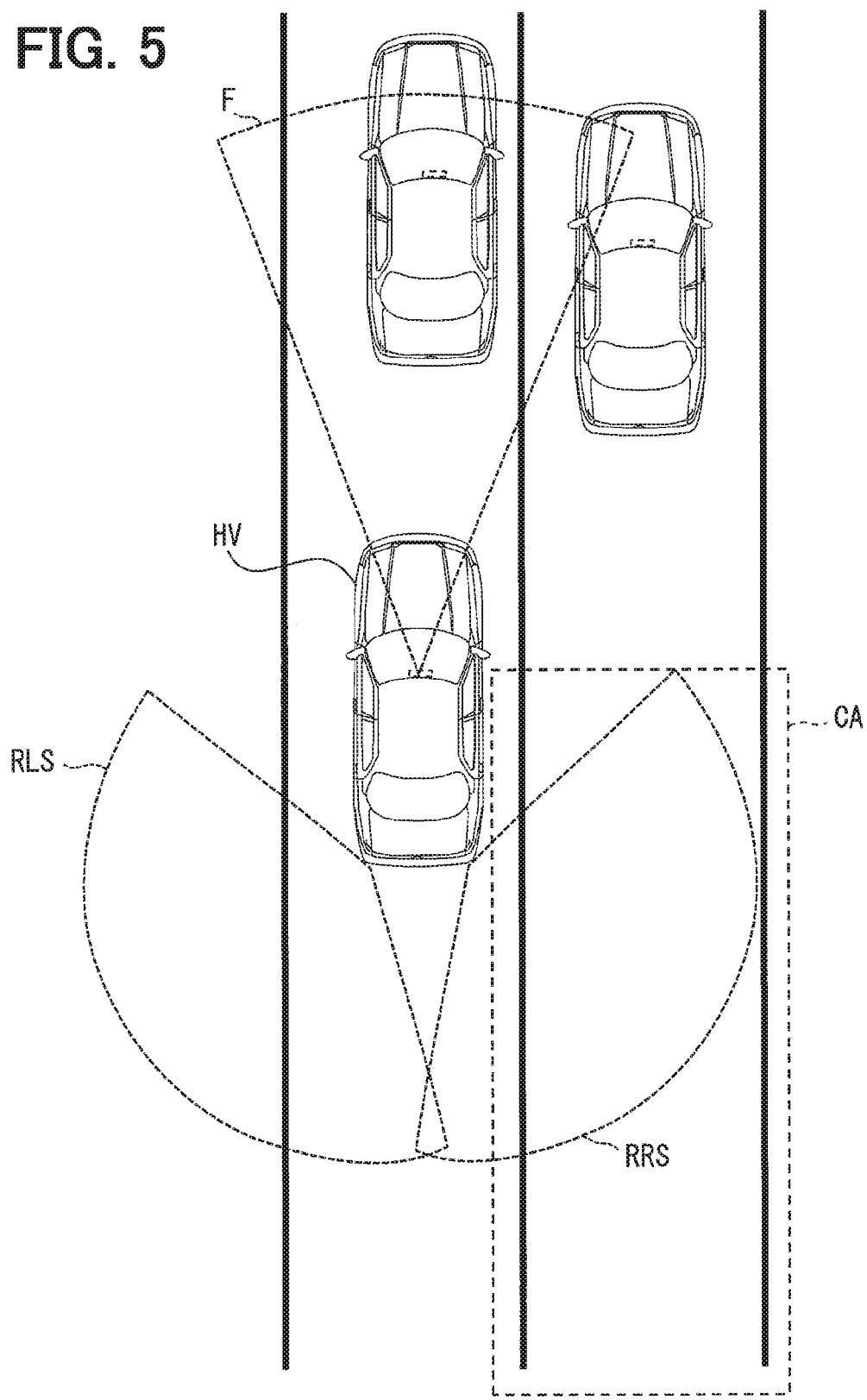
FIG. 5 is a diagram illustrating an example of an area where the driver needs to confirm safety in lane change in a first embodiment.

The following explains a specific example of the case where the host vehicle HV is performing lane change to move to enter a right adjacent lane. When the ACC function section 101 does not implement a driving assistance, the front area relative to the host vehicle HV and the rear and lateral area relative to the host vehicle HV are defined as a confirmation area requiring a safety confirmation (refer to "CA" in FIG. 4). In contrast, when the ACC function section 101 implements a driving assistance, the rear and lateral area relative to the host vehicle HV is defined as a confirmation area requiring a safety confirmation, the confirmation area precluding the front area relative to the host vehicle HV (refer to "CA" in FIG. 5).

The area presentation instructor section 130 sends an assignment result of the confirmation area determined by the assignment determiner section 120 to the HCU 30. Upon receiving the assignment result of the confirmation area from the area presentation instructor section 130, the HCU 30 causes the display apparatus 33 and/or the sound output apparatus 34 to present the information indicating the confirmation area based on the received assignment result of the confirmation area. When an exemption area is present due to the driving assistance by the assister section 100, the area presentation instructor section 130 presents the information indicating the confirmation area that precludes such an exemption area. This explicitly indicates an area whose safety needs to be confirmed by the driver.

An example of presenting a confirmation area precluding an exemption area at the time of lane change is a display by text or an announce by speech of "please confirm safety of a rear and lateral area and give an instruction for the lane change". Further, a display by image that indicates an arrangement of a confirmation area relative to the host vehicle HV may be performed to allow the driver to recognize the arrangement of the confirmation area relative to the host vehicle intuitively.

<Task Share Related Process>

Figure 6:
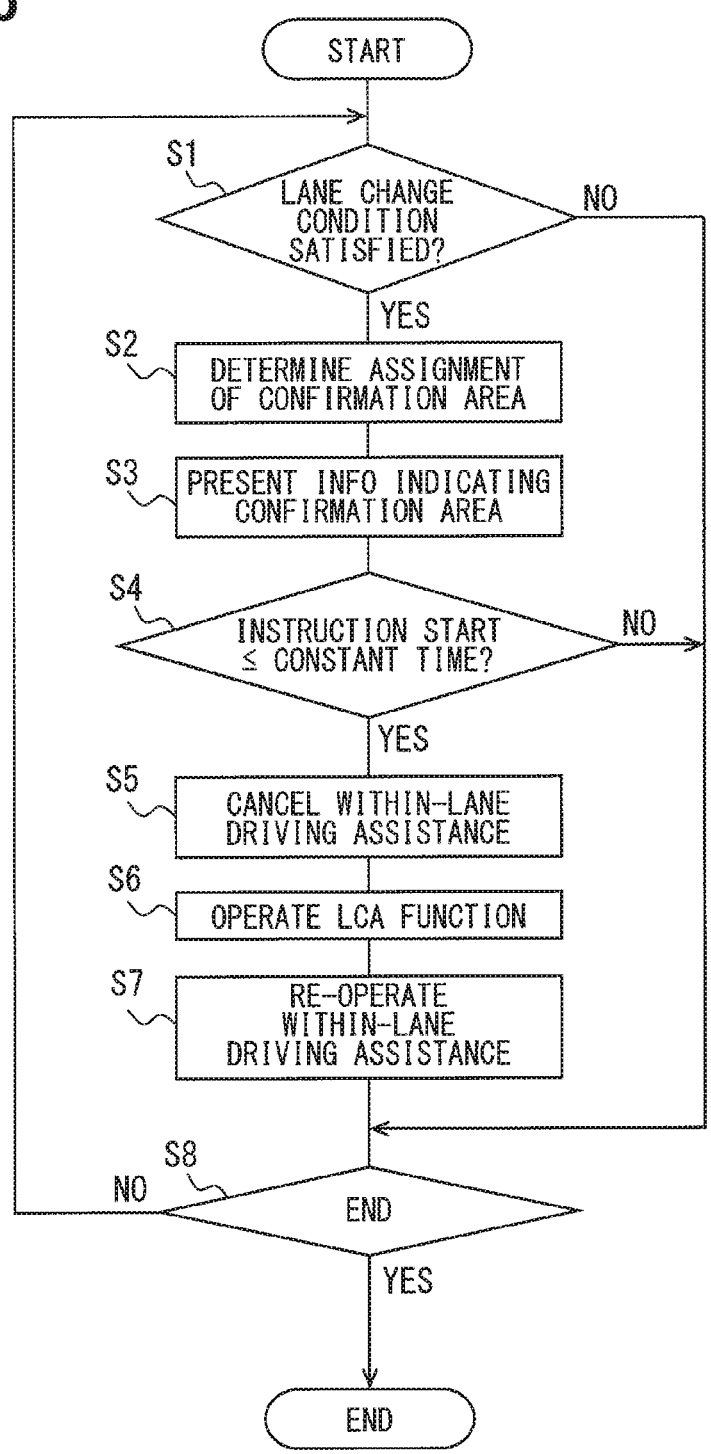
FIG. 6 is a flowchart illustrating an example of a sequence of a task share related process in a driving assistance ECU.

The following explains an example of a sequence of a process (hereinafter, referred to as a task share related process) that is relative to a task share by the driving assistance ECU 10 with reference to a flowchart of FIG. 6. The flowchart of FIG. 6 may be started when a within-lane driving assistance that is a driving assistance within a lane by the assister section 100 is turned ON (i.e., both the functions of ACC and LKA operating).

It is further noted that a flowchart to be described includes sections (also referred to as steps), which are represented, for instance, as S1. Further, each section can be divided into several sections while several sections can be combined into a single section. Each section may be referred to as a device or a specific name, or with a structure modification; for instance, a scene determiner section may be also referred to as a scene determiner device or a scene determiner. Further, each section can be achieved not only (i) as a software section in combination with a hardware unit (e.g., computer), but also (ii) as a section of a hardware circuit (e.g., integrated circuit, hard-wired logic circuit), including or not including a function of a related apparatus. Further, the section of the hardware circuit may be inside of a microcomputer.

First, at S1, the scene determiner section 110 determines whether a lane change condition is satisfied. When it is determined that a lane change condition is satisfied (S1: YES), the sequence proceeds to S2. By contrast, when it is determined that a lane change condition is not satisfied (S1: NO), the sequence proceeds to S8.

At S2, the assignment determiner section 120 determines an assignment of a confirmation area requiring the driver to confirm a safety, the confirmation area excluding an exemption area; the driving assistance by the assister section 100 exempts the driver from confirming a safety of the exemption area. In the example of the first embodiment, as mentioned above, the front area relative to the host vehicle HV is determined as an exemption area due to the function of ACC; the rear and lateral area relative to the host vehicle HV is determined as a confirmation area, which excludes the front area relative to the host vehicle HV. In the lane change to the right adjacent lane, the rear and right area relative to the host vehicle HV is determined as a confirmation area.

At S3, the area presentation instructor section 130 performs the information presentation indicating the confirmation area determined by the assignment determiner section 120 via the HCU 30.

At S4, the assister section 100 determines whether an instruction of starting a lane change is issued within a constant period of time since the start of the information presentation at S3. The period of time may be counted by a timer circuit. The constant period of time may be set as needed so as to secure a sufficient period of time to complete confirming a safety. When it is determined that an instruction of starting a lane change is issued within a constant period of time (S4: YES), the sequence proceeds to S5. When it is determined that an instruction of starting a lane change is not issued within a constant period of time (S4: NO), the sequence proceeds to S8.

Suppose a case where an exclusive use switch is provided as the manipulation input unit 31 to permit the movement to the adjacent lane due to the function of LCA. In this case, the assister section 100 may determine that an instruction of starting a lane change is issued in response to receiving a signal indicating the exclusive use switch being turned ON via the HCU 30. In addition, suppose a case where a blinker signal is not used for the scene determiner section 110 to determine whether a lane change condition is satisfied. In this case, the assister section 100 may determine that an instruction of starting a lane change is issued in response to receiving a blinker signal via the HCU 30.

Furthermore, the assister section 100 may determine that an instruction of starting a lane change is issued from an extraction result of the direction of the face or the sight line direction of the driver acquired from the DSM 32 via the HCU 30. For instance, from the above extraction result, the assister section 100 may detect that the direction of the face and/or the sight line direction of the driver faces the rear and lateral area relative to the host vehicle HV on the adjacent lane for lane change or a door mirror on the side for the lane change a predetermined period of time or greater and then returns to face the front. In this case, an instruction of starting a lane change may be determined to be issued. This configuration generates an instruction of starting a lane change without need of the driver manipulating the manipulation input unit 31, enabling the reduction in the work load by the driver.

In the case of using the DSM 32, suppose that a lane change is determined to be under a disabled state although a safety confirmation is performed. Under such a case, it is preferable that the action of the direction of the face and/or the sight line direction returning to face the front is not determined to be an instruction of starting a lane change. As one example, suppose that a switch for suspending any lane change is provided as the manipulation input unit 31. In such a case, when the assister section 100 acquires a signal indicating that such a switch is turned ON via the HCU 30, it is not determined that an instruction of starting a lane change is issued.

Further, suppose a case that a speech recognition system, which is mounted in the host vehicle HV, recognizes a speech command permitting start of a lane change. In such a case, the assister section 100 may determine that an instruction of starting a lane change is issued. This configuration also generates an instruction of starting a lane change without need of the driver manipulating the manipulation input unit 31, enabling the reduction in the work load by the driver.

At S5, the assister section 100 once cancels the within-lane driving assistance. At S6, the assister section 100 operates the function of the LCA to move the host vehicle HV to the adjacent lane. At 57, the assister section 100 again operates the within-lane driving assistance.

At S8, when the task share related process arrives at a point of time of ending (S8: YES), the task share related process is ended. By contrast, when the task share related process does not arrive at a point of time of ending (S8: NO), the sequence returns to S1 to repeat the process. An example of arriving at a point of time of ending the task share related process includes the within-lane driving assistance being turned OFF due to the driver manipulating the manipulation input unit 31, or the ignition power of the host vehicle HV being turned OFF.

When the assister section 100 does not implement a driving assistance and the driver performs a lane change manually, an exemption area is not generated; thus, the area presentation instructor section 130 may present the information indicating a confirmation area not precluding any exemption area. Further, when the driver performs a lane change manually, the area presentation instructor section 130 may not present any information indicating a confirmation area.

Further, the driving assistance ECU 10 may be configured to switch between the information presentation that indicates a confirmation area precluding an exemption area, and the information presentation that indicates a confirmation area not precluding an exemption area, depending on the presence or absence of an exemption area due to the driving assistance by the assister section 100. This enables the driver to easily recognize that the preclusion of the exemption area leads to the reduction of work load in safety confirmation.

Summary of First Embodiment

The first embodiment provides configurations as follows. A safety-confirmed driving scene is a scene in which the driver is required to confirm safety. A confirmation area is an area which the driver is required to confirm safety of. An exemption area is an area which the driver is exempted from confirming safety of. At a lane change serving as the safety-confirmed driving scene, the ACC function allows the confirmation area to preclude a front area relative to the host vehicle HV determined as the exemption area. The confirmation area is thereby narrowed to a rear and lateral area relative to the host vehicle HV as a narrowed confirmation area. Further, an information presentation is made so as to indicate that the safety confirmation is required to be applied to only such a narrowed confirmation area; thus, the driver is enabled to practically limit the confirmation area to the narrowed confirmation area, reducing the work load for the safety confirmation. As a result, the driver can be relieved from the work load to confirm safety while receiving a benefit from the driving assistance.

First Modification Example

In the first embodiment, the task share related process is started when the within-lane driving assistance by the assister section 100 is turned ON. There is no need to be limited thereto. For example, another configuration (hereinafter, first modification example) may be provided in which the task share related process is started even when the ACC function is operated without the LKA operated.

In addition, in the first modification example, suppose a case where the ACC function is enabled to switch a following target preceding vehicle from a preceding vehicle ahead of the host vehicle HV before a lane change to a preceding vehicle ahead of the host vehicle HV after the lane change. In such a case, in the task share related process, while the within-lane driving assistance is not cancelled, the LCA function may be activated to move the host vehicle to an adjacent lane.

Second Modification Example

The driving assistance application described in the first embodiment is just an example of a driving assistance application that avoids an approach to an obstacle. There is no need to be limited thereto. Such a driving assistance application avoiding an approach to an obstacle may include a driving assistance application which avoids an approach to an obstacle by reporting an obstacle approaching a host vehicle HV, or a driving assistance application which avoids an approach to an obstacle by automatically applying a braking control to a host vehicle HV at the time of the obstacle approaching the host vehicle HV. In addition, an area which a driver is required to confirm safety of may be a confirmation area that precludes an exemption area, which the above two driving applications each exempt the driver from confirming safety of.

Third Modification Example

Suppose a case where the assignment determiner section 120 determines an assignment of a confirmation area. In such a case, the assister section 100 may provide a driving assistance application avoiding an approach to an obstacle present in an exemption area with a margin for avoiding the approach to the obstacle such that the margin after the assignment of the confirmation area is determined is greater than that before the assignment of the confirmation area is determined. This configuration can reduce a risk of an approach to an obstacle due to the driver not confirming safety of the exemption area.

Figure 7:
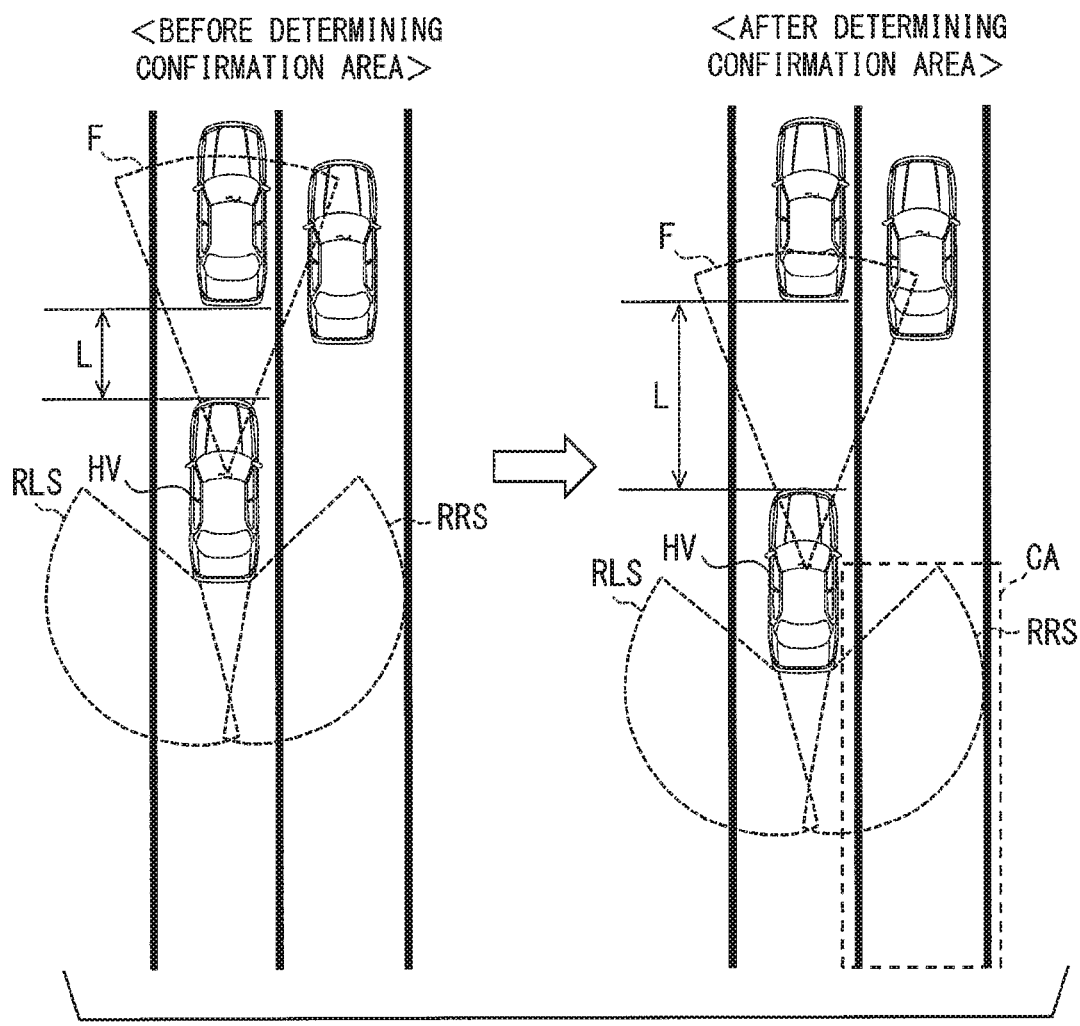
FIG. 7 is a diagram illustrating an example of reducing a risk in an exemption area according to a third modification example.

Suppose a case where a driving assistance application is implemented by the ACC function section 101. In such a case, as in "L" in FIG. 7, an inter-vehicle distance with a preceding vehicle may be lengthened such that an inter-vehicle distance after the assignment of the confirmation area is determined is greater than that before the assignment of the confirmation area is determined. Further, suppose a case where a driving assistance application is implemented to report an approach of an obstacle to a host vehicle HV. In such a case, the point of time of reporting the approach after the assignment of the confirmation area is determined may be made earlier than that before the assignment of the confirmation area is determined. Further, suppose a case where a driving assistance application is implemented to apply an automated braking control to a host vehicle HV when an obstacle approaches a host vehicle HV. In such a case, the point of time of starting the brake control after the assignment of the confirmation area is determined may be made earlier than that before the assignment of the confirmation area is determined.

Fourth Modification Example

In addition, suppose a case where under the configuration according to the third modification example being provided, the assignment determiner section 120 determines an assignment of a confirmation area. In such a case, the driving assistance ECU 10 may preferably present the information indicating that a margin in a driving assistance for avoiding an approach to an obstacle present in an exemption area after the assignment of the confirmation becomes greater than that before the assignment of the confirmation area. This configuration can notify the driver of a countermeasure that reduces a risk of an approach to an obstacle due to the driver not confirming safety of the exemption area, providing the driver with the sense of security.

Fifth Modification Example

In addition, when the assignment determiner section 120 determines a confirmation area, the driving assistance ECU 10 may be configured to stop sensing whose sensing range is included in the confirmation area, such as an image capture with a monitoring sensor, or a scan of search waves and a reception of reflected waves.

Sixth Modification Example

In addition, when the assignment determiner section 120 determines a confirmation area, the driving assistance ECU 10 may be configured to narrow a sensing range by a monitoring sensor whose sensing range is included in the confirmation area. When the sensing range is narrowed, at least an area, which is estimated to be in a dead angle of the driver in the confirmation area, may be preferably included still in the sensing range.

Seventh Modification Example

In addition, when the assignment determiner section 120 determines a confirmation area, another configuration (hereinafter, seventh modification example) may be provided in which a hardware resource used for a monitoring sensor whose sensing range is included in the confirmation area is switched to be assigned to a monitoring sensor whose sensing range is included in an exemption area.

Figure 8:
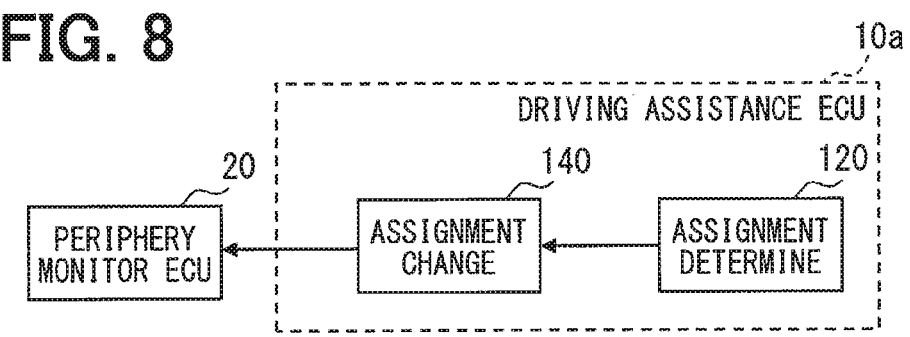
FIG. 8 is a diagram illustrating an example of a schematic configuration of a driving assistance ECU according to a seventh modification example.

The following explains an example of a schematic configuration of a driving assistance ECU 10a according to the seventh modification example with reference to FIG. 8. In FIG. 8, among the constituent elements of the driving assistance ECU 10a, other than those different from the driving assistance ECU 10 are omitted. The driving assistance ECU 10a is the same as the driving assistance ECU 10 according to the first embodiment except for including an assignment changer section 140 (which is also referred to as an assignment changer 140).

When the assignment determiner section 120 determines a confirmation area, the assignment changer section 140 makes a change to assign a hardware resource used for a monitoring sensor whose sensing range is included in the confirmation area to the use by a monitoring sensor whose sensing range is included in an exemption area. As an example, the assignment changer section 140 may be configured to send the result of the assignment of the confirmation area determined by the assignment determiner section 120 to the periphery monitoring ECU 20, thereby changing the assignment of the hardware resource.

This is illustrated with the driving assistance system 1 according to the first embodiment. When the assignment determiner section 120 determines a confirmation area, the assignment changer section 140 makes a change to assign a hardware resource used for the second monitoring sensor 22 and the third monitoring sensor 23 to the use for the first monitoring sensor 21.

Figure 9:
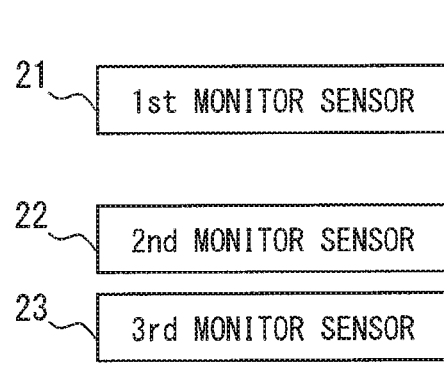
FIG. 9 is a diagram illustrating an example of changing an assignment of hardware resources used by monitoring sensors.
Figure 9:
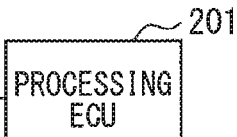
Figure 9:
Figure 9:
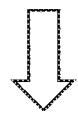
Figure 9:
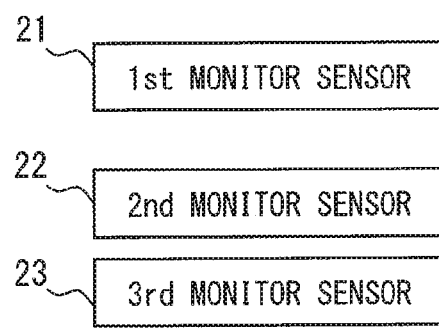
Figure 9:
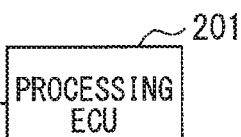
Figure 9:

An example of the change in assignment of a hardware resource used for a monitoring sensor is explained using FIG. 9. FIG. 9 illustrates an example of a configuration in which the hardware resources used for the monitoring sensors correspond to the periphery monitoring ECU 20, and the periphery monitoring ECU 20 includes a plurality of ECUs having a processing ECU 201 and a processing ECU 202.

As in FIG. 9, before the assignment change of the hardware resources, the processing ECU 201 is used for the first monitoring sensor 21 while the processing ECU 202 is used for the second monitoring sensor 22 and the third monitoring sensor 23. In contrast, after the assignment change of the hardware resources, the processing ECU 202 is not used for the second monitoring sensor 22 and the third monitoring sensor 23 whereas the processing ECU 201 and the processing ECU 202 are used for the first monitoring sensor 21.

The processing ECU 201 and the processing ECU 202 may be previously installed with programs about acquisition sources from which information is acquired and processes for sensing depending on the assignment of confirmation area, thereby switching the acquisition sources from which information is acquired and the processes for sensing depending on the result of the assignment of the confirmation area which are sent from the assignment changer section 140.

In FIG. 9, the ECUs are illustrated as the hardware resources which are assigned. Such hardware resources which are assigned only need to be a hardware resource used for the process about sensing of a monitoring sensor, such as a processor or a CPU.

Figure 10:
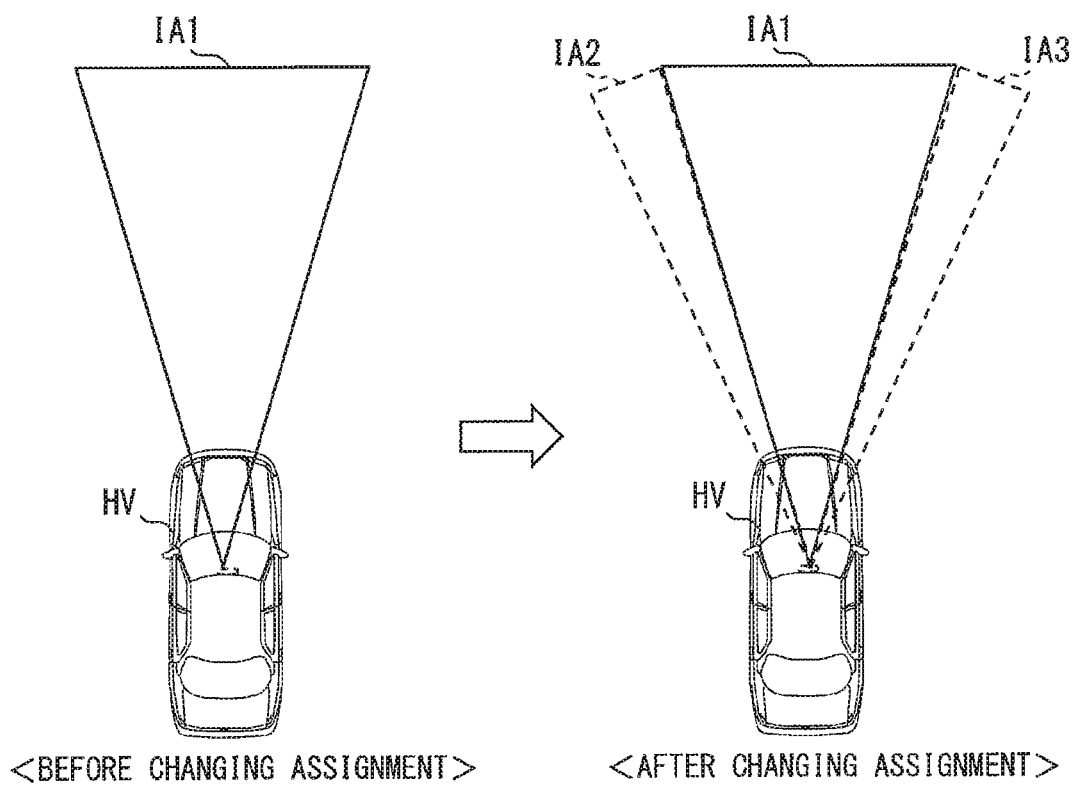
FIG. 10 is a diagram for explaining an example of using an increased hardware resource in a monitoring sensor.
Figure 11:
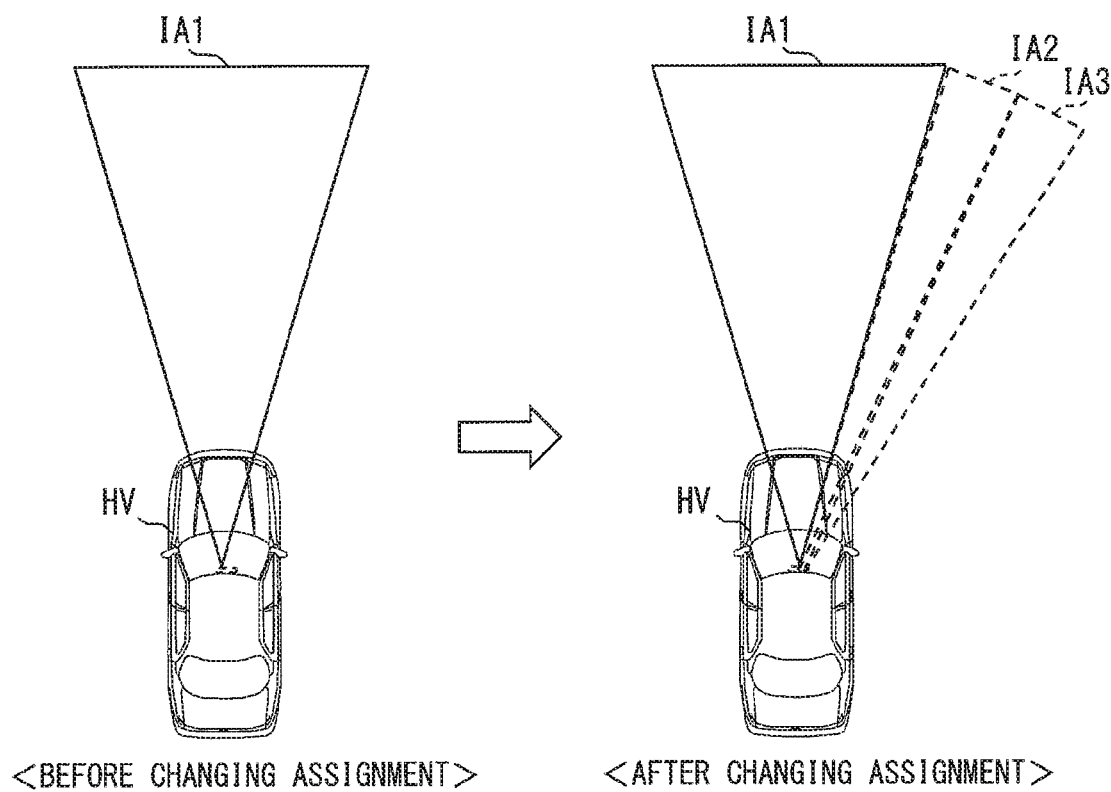
FIG. 11 is a diagram for explaining an example of using an increased hardware resource in a monitoring sensor.

An example of using increased hardware resources in a monitoring sensor will be explained with reference to FIGS. 10 and 11. FIGS. 10 and 11 illustrate the processing ECU 201 and the processing ECU 202 used for the first monitoring sensor 21 due to the assignment change in the hardware resources. In FIGS. 10 and 11, "IA1" indicates a detection target range before the assignment change in the hardware resources, whereas "IA2" and "IA3" indicate detection target range after the assignment change in the hardware resources.

When the hardware resources enabled to be used by the first monitoring sensor 21 increases, the processing amount per unit time in an image recognition process of a captured image by the first monitoring sensor 21 increases. The above-mentioned detection target range can therefore be enlarged to the left and/or right direction as in FIG. 10.

Further, the above-mentioned detection target range can be unsymmetrically enlarged to either the left direction or the right direction as in FIG. 11. Such unsymmetrically enlarged direction may preferably correspond to whichever of left or right the host vehicle HV moves in lane change. Even in the case of FIGS. 10 and 11, the enlargement of the detection target range needs to be limited up to the capturing range (i.e., sensing range) of the first monitoring sensor 21.

Although FIGS. 10 and 11 illustrate an example of using a camera as a monitoring sensor, a sensor scanning with search waves such as a milliwave radar, a laser radar, or a sonar may be used as a monitoring sensor. Such a case may be configured as increasing the number of steps of scanning an identical sensing range with search waves so as to enhance a detection accuracy of an obstacle.

Not limiting to a configuration where an assignment change in the hardware resources of a plurality of ECUs, a plurality of processors, and a plurality of CPUs, another configuration may be provided where a virtualizing technology is uses to dynamically assign one ECU, one processor, and one CPU. Such virtualizing technology enables virtual operations as if a plurality of cores are present even if only one ECU, one processor, or one CPU is present. Further, such virtual cores may be parallelly operated. The virtualizing technology, which is generally named virtualization, may be configured to use Hypervisor.

Eighth Modification Example

Further, the driving assistance ECU 10 may be configured to present none of the information indicating the confirmation area without including any area presentation instructor section 130.

Ninth Modification Example

In addition, the assignment determiner section 120 may have another configuration (hereinafter, referred to as ninth modification example) where the assignment of the confirmation area is changed depending on the kind of the driving scene determined by the scene determiner section 110 as the driving scene requiring the driver to confirm safety.

In the ninth modification example, the scene determiner section 110 may determine whether a plurality of kinds of driving scenes each correspond to the driving scene requiring the driver to confirm safety. For instance, in addition to the determination as to whether a lane change condition is satisfied, whether a left turn condition or a right turn condition is satisfied may be determined. A left turn scene and a right turn scene provide mutually different areas which the driver needs to confirm safety of. Thus, the left turn condition being satisfied and the right turn condition being satisfied correspond to mutually different driving scenes.

The following ninth modification example is a modification example in a region where a left-hand traffic is legislated. In a region where a right-hand traffic is legislated, the left turn scene and the right turn scene in the following explanation become opposite.

The following explains an example of the determination of right turn condition being satisfied and left turn condition being satisfied by the scene determiner section 110. For example, the scene determiner section 110 determines whether the right turn condition or left turn condition is satisfied based on the position of the host vehicle HV and the position of the intersection which are obtained from the locator 40, and the blinker signal which is obtained from the HCU 30. As a specific example, it is determined that the right turn condition is satisfied in cases that (i) a distance between the host vehicle HV and an intersection in the heading direction of the host vehicle HV is less than a predetermined distance, and, simultaneously, (ii) the blinker signal which indicates the right winker lamp is turned ON is obtained. In contrast, it is determined that the left turn condition is satisfied in cases that (i) a distance between the host vehicle HV and an intersection in the heading direction of the host vehicle HV is less than a predetermined distance, and, simultaneously, (ii) the blinker signal which indicates the left winker lamp is turned ON is obtained. The above predetermined distance may be set as needed to be less than a distance where a lane change is prohibited before the intersection.

Further, suppose a case where the driving assistance ECU 10 can acquire a scheduled route in which a host vehicle HV is scheduled to travel such as a recommended route in a route guidance by a car navigation apparatus or a travel scheduled route in an automatic driving. In such a case, the scene determiner section 110 may determine whether the right turn condition or left turn condition is satisfied by using the scheduled route instead of using a blinker signal. For instance, the scene determiner section 110 may determine the right turn condition being satisfied when the scheduled route indicates that the host vehicle HV needs a right turn at an intersection in the heading direction and the distance between the host vehicle HV and the intersection is less than a predetermined distance. The similar is applied to the left turn.

Then, when the scene determiner section 110 determines that a driving scene requiring the driver to confirm safety takes place, the assignment determiner section 120 according to the ninth modification example changes the assignment of the confirmation area depending on the kind of the driving scene. As a specific example, the nonvolatile memory of the driving assistance ECU 10 may store a correspondence relation between (i) the driving assistance applications being implemented and (ii) the confirmation areas, with respect to each of the kinds of driving scenes. This correspondence relation may be referred to by the assignment determiner section 120 so as to determine the confirmation area corresponding to the kind of the driving scene and the driving assistance application being implemented.

The following explains an example of the confirmation area according to the kind of the driving scene. In the case of the driving scene of "lane change condition being satisfied", as explained in the first embodiment, a front area relative to the host vehicle HV is determined due to the function of ACC as an exemption area; a rear and lateral area relative to the host vehicle HV is determined as a confirmation area, which precludes the front area relative to the host vehicle HV.

Figure 12:
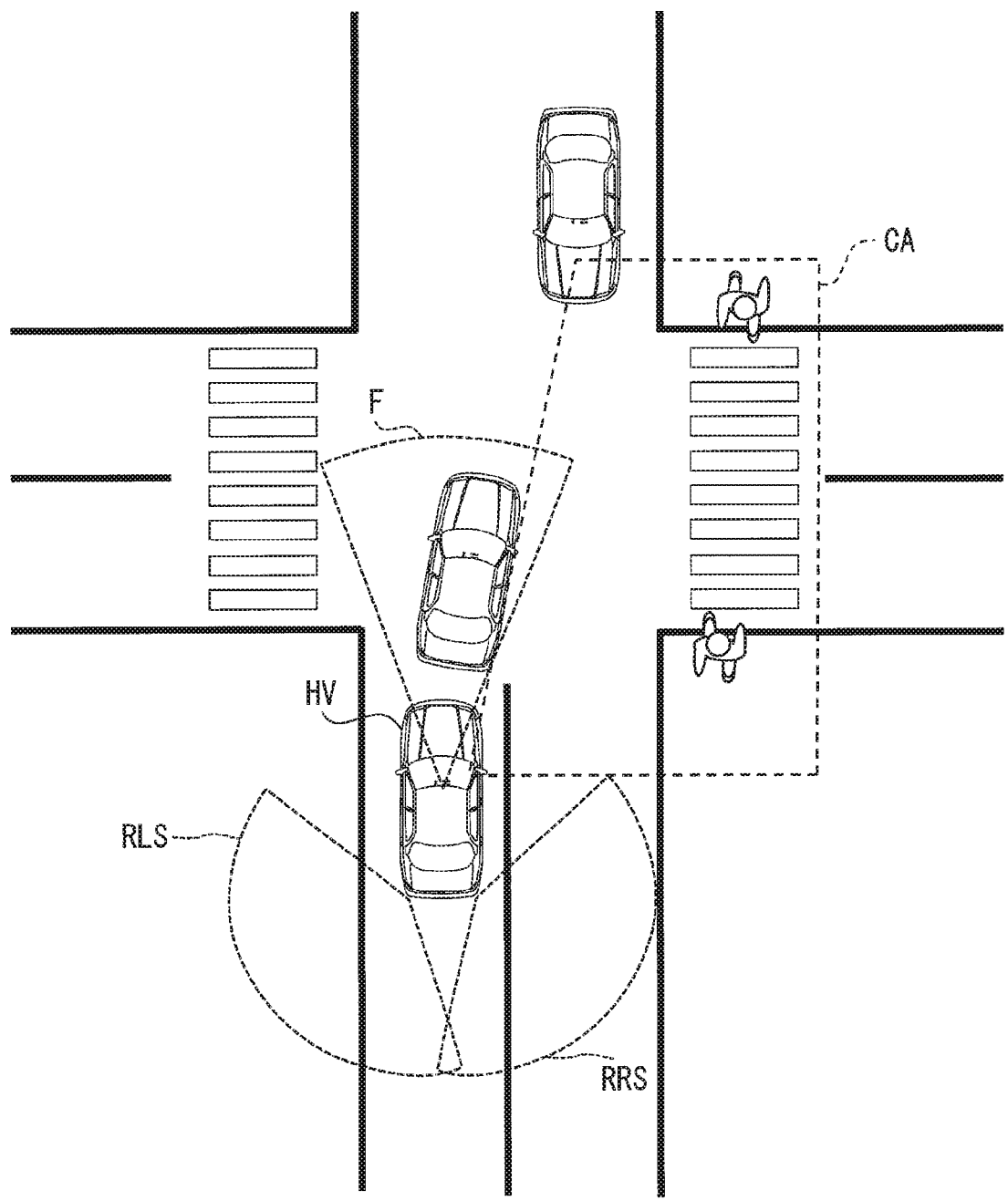
FIG. 12 is a diagram illustrating an example of an area where the driver needs to confirm safety when turning to the right according to a ninth modification example.

In the case of the driving scene of "right turn condition being satisfied", unlike the scene "lane change to the right", a vehicle such as an automobile, a bicycle, or a motorcycle, is not present in a rear and right area relative to the host vehicle HV. While the necessity of paying attention to a rear and right area relative to the host vehicle HV is low, the necessary arises which pays attention to an oncoming vehicle in a diagonally forward right area relative to the host vehicle HV or a pedestrian in a crosswalk in an area from a diagonally forward right side to a right side relative to the host vehicle HV. In the case of the driving scene "right turn condition being satisfied", among a front area relative to the host vehicle HV, and an area from a diagonally forward right side to a right side relative to the host vehicle HV, (i) the front area relative to the host vehicle HV is determined as an exemption area due to the function of ACC and (ii) an area from a diagonally forward right side to a right side relative to the host vehicle HV is determined as a confirmation area (refer to "CA" in FIG. 12), which precludes the front area relative to the host vehicle HV serving as the exemption area.

Figure 13:
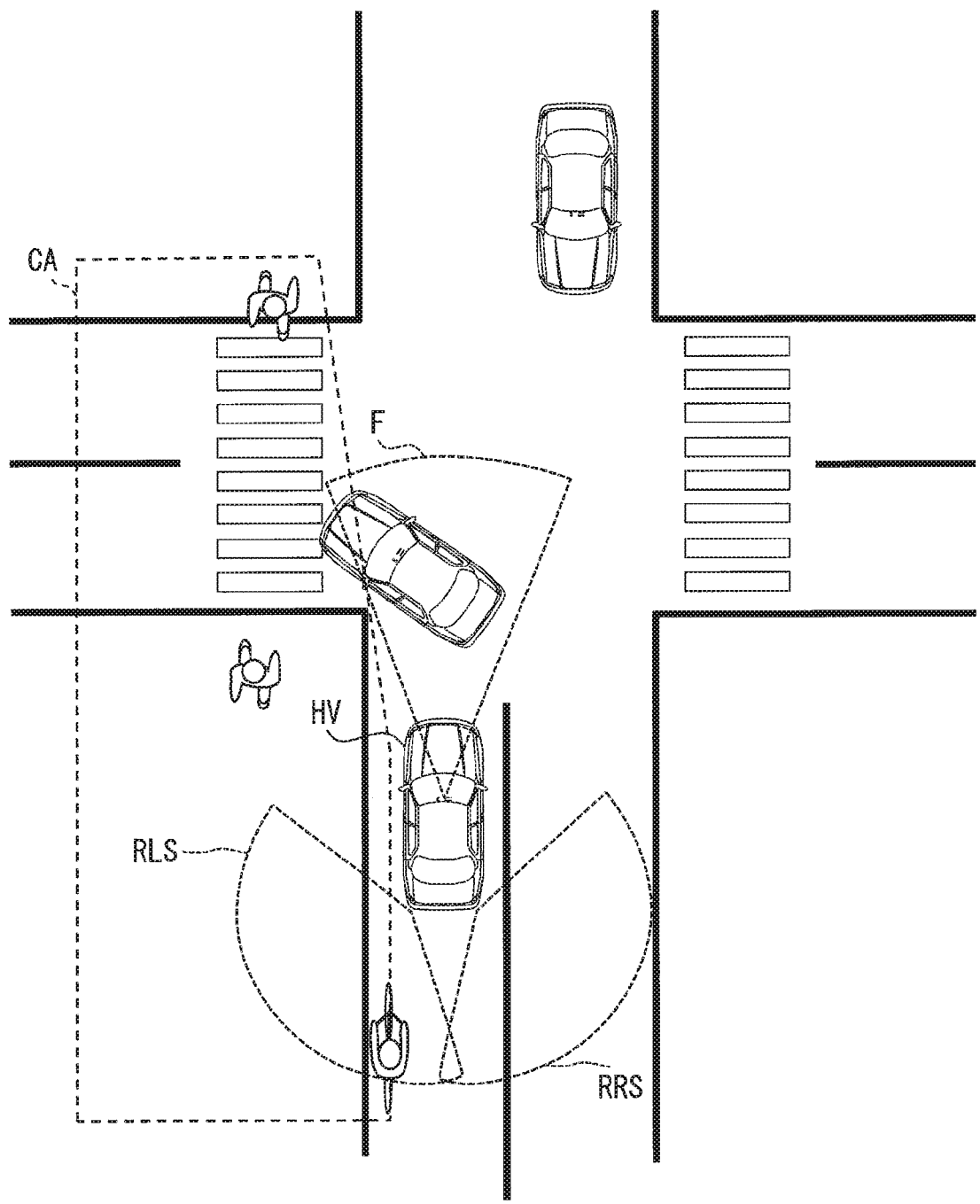
FIG. 13 is a diagram illustrating an example of an area where the driver needs to confirm safety when turning to the left according to the ninth modification example.

In addition, in the case of the driving scene "left turn condition being satisfied", the necessary arises which pays an attention to (i) a preceding vehicle ahead of the host vehicle HV, (ii) a bicycle or a motorcycle in a rear and left area relative to the host vehicle HV, and (iii) a pedestrian in a crosswalk in an area from a diagonally forward left side to a left side relative to the host vehicle HV. In the case of the driving scene "left turn condition being satisfied", among a front area relative to the host vehicle HV, a rear and left area relative to the host vehicle HV, and an area from a diagonally forward left side to a left side relative to the host vehicle HV, (i) the front area relative to the host vehicle HV is determined as an exemption area due to the function of ACC and (ii) an area from a diagonally forward left side to a left side relative to the host vehicle HV is determined as a confirmation area that precludes the front area relative to the host vehicle HV serving as the exemption area (refer to "CA" in FIG. 13).

Further, near the intersection, a bicycle or motorcycle in a rear and left area relative to the host vehicle HV may be also decelerated; thus, another configuration may be provided as follows. On the premise of the function of BSM fully detecting the bicycle or motorcycle, the rear and left area relative to the host vehicle NV is determined also as an exemption area. In this case, the area from the diagonally forward left side to the left side relative to the host vehicle HV is determined as the confirmation area which precludes the front area relative to the host vehicle HV and the rear and left area relative to the host vehicle HV.

The configuration according to the ninth modification example changes the assignment of the confirmation area depending on the kind of the driving scene. This can reduce the work load of the driver in confirming safety according to the kind of the driving scene while providing the driver with the benefit of the driving assistance according to the kind of the driving scene.

Tenth Modification Example

In addition, the number of monitoring sensors, the kinds of monitoring sensors, or a combination of kinds of monitoring sensors is not limited to the mentioned above. For instance, another configuration may be provided where a plurality of kinds of monitoring sensors have an overlapped sensing range such that sensing a front area relative to the host vehicle HV is made by a camera and a milliwave radar that are used together. Further, a monitoring sensor may include a milliwave radar having a sensing range covering a diagonally forward left area and a diagonally forward right area relative to the host vehicle HV. Furthermore, a sonar may be provided to have a sensing range covering areas near right and left front corners of the host vehicle HV, and areas near a right and left rear corners of the host vehicle HV.

Eleventh Modification Example

The first embodiment explains, as a work in claims, a safety confirmation by a driver; however, there is no need to be limited thereto. For instance, other than the safety confirmation by the driver, the present disclosure may be applied to a work, which at least provides a driver with a load, can be assigned between the driver and the driving assistance application. In particular, suppose a case where a work which a driving application excels in and a work which a driver excels in are mixed in a driving scene. Such a case is preferably provided such that a work which a driving assistance application excels in is assigned to the driving assistance application whereas a work which a driver excels in is determined as a work implemented by the driver. As a result, the driver can be relieved from the work load while receiving a benefit from the driving assistance.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

The invention claimed is:

1. A driving assistance apparatus including a driving assister section that provides a driving assistance to a driver in a vehicle using a sensing result by a sensor device monitoring a periphery of the vehicle, the driving assistance apparatus comprising:
a scene determiner section configured to determine whether a driving scene requiring the driver to work takes place; and
an assignment determiner section configured to determine an assignment of an implementation work that is to be implemented by the driver according to a driving scene requiring the driver to work in response to that the scene determiner section determines that the driving scene requiring the driver to work takes place, the implementation work precluding an exemption work, wherein the driving assister section exempts the driver from implementing the exemption work,
wherein:
the scene determiner section is configured to determine whether a driving scene requiring the driver to confirm safety takes place; and
the assignment determiner section is configured to determine an assignment of a confirmation area that is to be confirmed by the driver according to a driving scene requiring the driver to confirm safety in response to that the scene determiner section determines that the driving scene requiring the driver to confirm safety takes place, the confirmation area precluding an exemption area, wherein the driving assister section exempts the driver from confirming safety of the exemption area,
wherein
in response to that the assignment determiner section determines the confirmation area,
a sensing range of the sensor device, the sensing range being included in the confirmation area, is caused to be narrowed,
the scene determiner section is configured to determine whether one of a plurality of kinds of driving scenes requiring the driver to work takes place, and
the assignment determiner section is configured to change the assignment of the implementation work that is to be implemented by the driver according to one of kinds of driving scenes in response to that the scene determiner section determines that the one of kinds of driving scenes requiring the driver to work takes place.

2. The driving assistance apparatus according to claim 1, further comprising:
a presentation instructor section configured to give an instruction to present information indicating the implementation work determined by the assignment determiner section, the implementation work precluding the exemption work.

3. The driving assistance apparatus according to claim 1, wherein
the driving assister section is configured to perform a driving assistance that avoids an approach to an obstacle by automatically controlling the vehicle using a sensing result by the sensor device.

4. The driving assistance apparatus according to claim 3, wherein
before the assignment determiner section determines the assignment of the confirmation area, the driving assister section is configured to perform a driving assistance with a first margin to avoid an approach to an obstacle in a sensing range of the sensor device; and
after the assignment determiner section determines the assignment of the confirmation area, the driving assister section is configured to perform a driving assistance with a second margin to avoid an approach to an obstacle in a sensing range of the sensor device, the second margin after the assignment determiner section determines the assignment of the confirmation area being caused to be greater than the first margin before the assignment determiner section determines the assignment of the confirmation area.

5. The driving assistance apparatus according to claim 1, further comprising:
an assignment changer section configured to change an assignment of a hardware resource,
wherein:
the sensor device includes a plurality of sensors that provide mutually different sensing ranges, each of the sensors sensing using a hardware resource whose assignment is enabled to be changed; and
in response to that the assignment determiner section determines the confirmation area, the assignment changer section is configured to change the assignment of the hardware resource so as to assign the hardware resource used by the sensor that senses the confirmation area to the sensor that senses the exemption area.

6. The driving assistance apparatus according to claim 1, wherein:
the scene determiner section is configured to determine whether a lane change takes place as the driving scene requiring the driver to confirm safety;
the driving assister section is configured to perform a driving assistance that avoids an approach to an obstacle in front of the vehicle using a sensing result by the sensor device; and
in response to that the scene determiner section determines that the lane change takes place, the assignment determiner section is configured to determine, as the confirmation area, an area covering a lane which the vehicle intends to move to enter in the lane change, the area being diagonally behind the vehicle, the area precluding a front area in front of the vehicle, the front area serving as the exemption area.

7. A driving assistance apparatus including a driving assister section that provides a driving assistance to a driver in a vehicle using a sensing result by a sensor device monitoring a periphery of the vehicle,
the driving assistance apparatus comprising:
a scene determiner section configured to determine whether a driving scene requiring the driver to work takes place; and
an assignment determiner section configured to determine an assignment of an implementation work that is to be implemented by the driver according to a driving scene requiring the driver to work in response to that the scene determiner section determines that the driving scene requiring the driver to work takes place, the implementation work precluding an exemption work, wherein the driving assister section exempts the driver from implementing the exemption work, wherein:

the scene determiner section is configured to determine whether a driving scene requiring the driver to confirm safety takes place;

the assignment determiner section is configured to determine an assignment of a confirmation area that is to be confirmed by the driver according to a driving scene requiring the driver to confirm safety in response to that the scene determiner section determines that the driving scene requiring the driver to confirm safety takes place, the confirmation area precluding an exemption area, wherein the driving assister section exempts the driver from confirming safety of the exemption area; and the driving assister section is configured to perform a driving assistance that avoids an approach to an obstacle by automatically controlling the vehicle using a sensing result by the sensor device, wherein:

before the assignment determiner section determines the assignment of the confirmation area, the driving assister section is configured to perform a driving assistance with a first margin to avoid an approach to an obstacle in a sensing range of the sensor device; and after the assignment determiner section determines the assignment of the confirmation area, the driving assister section is configured to perform a driving assistance with a second margin to avoid an approach to an obstacle in a sensing range of the sensor device, the second margin after the assignment determiner section determines the assignment of the confirmation area being caused to be greater than the first margin before the assignment determiner section determines the assignment of the confirmation area, wherein the scene determiner section is configured to determine whether one of a plurality of kinds of driving scenes requiring the driver to work takes place; and the assignment determiner section is configured to change the assignment of the implementation work that is to be implemented by the driver according to one of kinds of driving scenes in response to that the scene determiner section determines that the one of kinds of driving scenes requiring the driver to work takes place.

8. The driving assistance apparatus according to claim 7, further comprising:

a presentation instructor section configured to give an instruction to present information indicating the implementation work determined by the assignment determiner section, the implementation work precluding the exemption work.

9. The driving assistance apparatus according to claim 7, further comprising:

an assignment changer section configured to change an assignment of a hardware resource, wherein:

the sensor device includes a plurality of sensors that provide mutually different sensing ranges, each of the sensors sensing using a hardware resource whose assignment is enabled to be changed; and in response to that the assignment determiner section determines the confirmation area, the assignment changer section is configured to change the assignment of the hardware resource so as to assign the hardware resource used by the sensor that senses the confirmation area to the sensor that senses the exemption area.

10. The driving assistance apparatus according to claim 7, wherein:

the scene determiner section is configured to determine whether a lane change takes place as the driving scene requiring the driver to confirm safety;

the driving assister section is configured to perform a driving assistance that avoids an approach to an obstacle in front of the vehicle using a sensing result by the sensor device; and in response to that the scene determiner section determines that the lane change takes place, the assignment determiner section is configured to determine, as the confirmation area, an area covering a lane which the vehicle intends to move to enter in the lane change, the area being diagonally behind the vehicle, the area precluding a front area in front of the vehicle, the front area serving as the exemption area.

11. A driving assistance apparatus including a driving assister section that provides a driving assistance to a driver in a vehicle using a sensing result by a sensor device monitoring a periphery of the vehicle, the driving assistance apparatus comprising:

a scene determiner section configured to determine whether a driving scene requiring the driver to work takes place; and an assignment determiner section configured to determine an assignment of an implementation work that is to be implemented by the driver according to a driving scene requiring the driver to work in response to that the scene determiner section determines that the driving scene requiring the driver to work takes place, the implementation work precluding an exemption work, wherein the driving assister section exempts the driver from implementing the exemption work, wherein:

the scene determiner section is configured to determine whether a driving scene requiring the driver to confirm safety takes place; and the assignment determiner section is configured to determine an assignment of a confirmation area that is to be confirmed by the driver according to a driving scene requiring the driver to confirm safety in response to that the scene determiner section determines that the driving scene requiring the driver to confirm safety takes place, the confirmation area precluding an exemption area, wherein the driving assister section exempts the driver from confirming safety of the exemption area;

in response to that the assignment determiner section determines the confirmation area, a sensing range of the sensor device, the sensing range being included in the confirmation area, is caused to narrowed; and the driving assister section is configured to perform a driving assistance that avoids an approach to an obstacle by automatically controlling the vehicle using a sensing result by the sensor device.

12. The driving assistance apparatus according to claim 11, wherein:

the scene determiner section is configured to determine whether one of a plurality of kinds of driving scenes requiring the driver to work takes place; and the assignment determiner section is configured to change the assignment of the implementation work that is to be implemented by the driver according to one of kinds of driving scenes in response to that the scene determiner section determines that the one of kinds of driving scenes requiring the driver to work takes place.

13. The driving assistance apparatus according to claim 11, further comprising:
a presentation instructor section configured to give an instruction to present information indicating the implementation work determined by the assignment determiner section, the implementation work precluding the exemption work.

14. The driving assistance apparatus according to claim 13, wherein
before the assignment determiner section determines the assignment of the confirmation area, the driving assister section is configured to perform a driving assistance with a first margin to avoid an approach to an obstacle in a sensing range of the sensor device; and
after the assignment determiner section determines the assignment of the confirmation area, the driving assister section is configured to perform a driving assistance with a second margin to avoid an approach to an obstacle in a sensing range of the sensor device, the second margin after the assignment determiner section determines the assignment of the confirmation area being caused to be greater than the first margin before the assignment determiner section determines the assignment of the confirmation area.

15. The driving assistance apparatus according to claim 11, further comprising:
an assignment changer section configured to change an assignment of a hardware resource,
wherein:
the sensor device includes a plurality of sensors that provide mutually different sensing ranges, each of the sensors sensing using a hardware resource whose assignment is enabled to be changed; and
in response to that the assignment determiner section determines the confirmation area, the assignment changer section is configured to change the assignment of the hardware resource so as to assign the hardware resource used by the sensor that senses the confirmation area to the sensor that senses the exemption area.

16. The driving assistance apparatus according to claim 11, wherein:
the scene determiner section is configured to determine whether a lane change takes place as the driving scene requiring the driver to confirm safety;
the driving assister section is configured to perform a driving assistance that avoids an approach to an obstacle in front of the vehicle using a sensing result by the sensor device; and
in response to that the scene determiner section determines that the lane change takes place, the assignment determiner section is configured to determine, as the confirmation area, an area covering a lane which the vehicle intends to move to enter in the lane change, the area being diagonally behind the vehicle, the area precluding a front area in front of the vehicle, the front area serving as the exemption area.

* * * * *